E. A. HAND.
SLICING MACHINE.
APPLICATION FILED APR. 29, 1910.

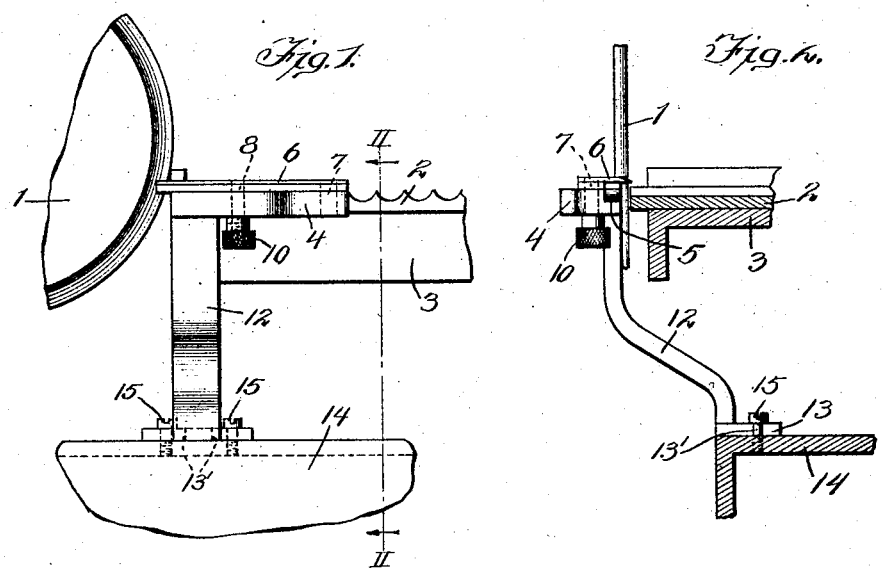
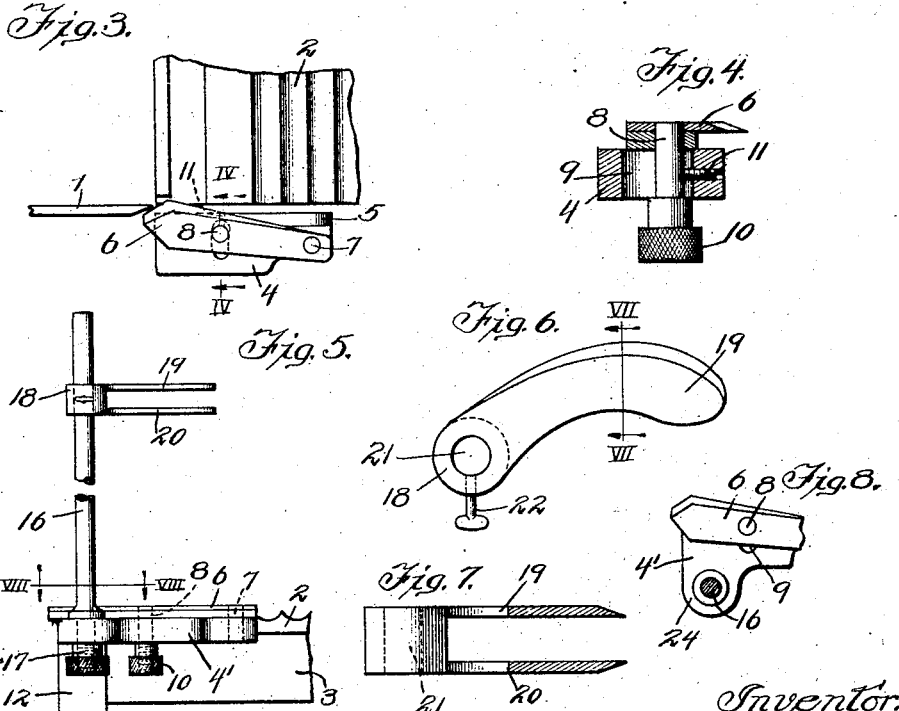

1,012,200.

Patented Dec. 19, 1911.
2 SHEETS—SHEET 2.

Witnesses

Inventor
Enos Alfred Hand
By Brown & Hopkins
Atty's

UNITED STATES PATENT OFFICE.

ENOS ALFRED HAND, OF CHICAGO, ILLINOIS, ASSIGNOR TO U. S. SLICING MACHINE CO., OF CHICAGO, ILLINOIS, A CORPORATION OF ILLINOIS.

SLICING-MACHINE.

1,012,200. Specification of Letters Patent. Patented Dec. 19, 1911.

Application filed April 29, 1910. Serial No. 558,373.

*To all whom it may concern:*

Be it known that I, ENOS ALFRED HAND, a subject of the King of England, residing at Chicago, in the county of Cook and State of Illinois, have invented certain new and useful Improvements in Slicing-Machines, of which the following is a specification.

This invention relates to slicing machines in general, but more especially to meet slicing machines.

The primary object of this invention is to provide improved means for removing the rind from a rasher of bacon or other meat.

A further object is to provide an improved device for this purpose which will be operative simultaneously with the slicing operation.

A more specific object of the present invention is to provide an improved rind-removing knife which may be moved into and out of operating position on a meat-slicing machine.

Another object is to provide improved adjustable means for determining the operative position of the rind-removing knife.

Another object is to provide improved means whereby one or more additional rind-removing knives may be mounted on the machine for simultaneously removing the rinds from two or more pieces of bacon or other meat.

Other and further objects will appear in the specification and be specifically pointed out in the claims, reference being had to the accompanying sheet of drawings, showing an exemplification of the invention.

Figure 9:
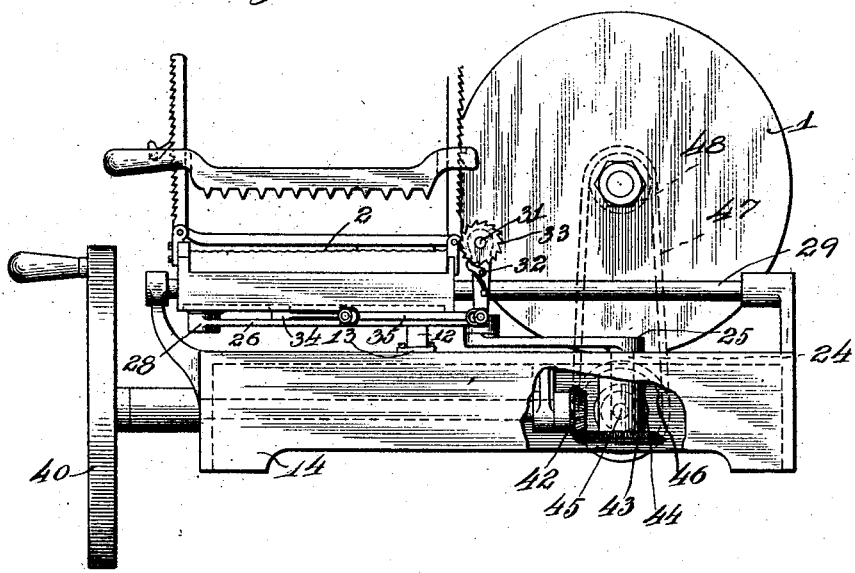
Figure 10:
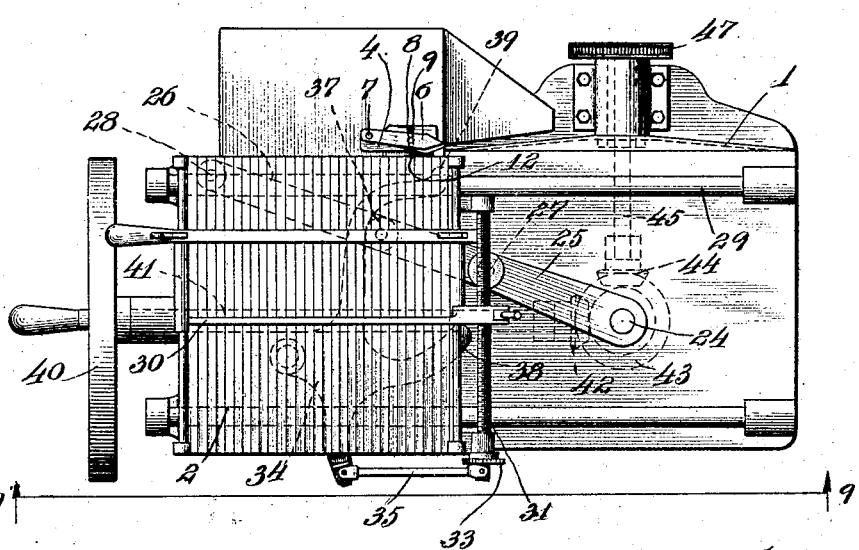

Figure 1 is a side elevation of portions of a meat-slicing machine provided with improved rind-removing means constructed in accordance with the principles of this invention. Fig. 2 is a section on the line II—II of Fig. 1. Fig. 3 is a top plan view of the parts shown in Fig. 1. Fig. 4 is a section on the line IV—IV of Fig. 3. Fig. 5 is a side elevation of a modified form of the device for simultaneously removing the rinds from two or more pieces of bacon or other meat while it is being sliced. Fig. 6 is a top plan view of a pair of additional rind-removing knives. Fig. 7 is a section on the line VII—VII of Fig. 6. Fig. 8 is a section on the line VIII—VIII of Fig. 5. Fig. 9 is an elevation on line 9—9, Fig. 10. Fig. 10 is a top plan view of a meat slicing machine showing an improved attachment constructed in accordance with the principles of this invention applied thereto.

With the present state of the art in meat slicing machines, much inconvenience and loss of time has been occasioned to the meat merchant due to the fact that the rind on meats, such as bacon and the like, must be removed before it is delivered to the consumer. Since it is desirable, for the sake of keeping the meat fresh, to keep the rind thereon until it has been cut, considerable time and effort on the part of the retailer is consumed in cutting the rind from the individual rashers of meat, or in cutting the rind from the meat before it is cut into slices. Moreover, when the rind is removed by hand, portions of the fat are detached with it, thereby entailing considerable loss to the consumer. By the use of a device constructed in accordance with the principles of the present invention, these losses and inconveniences may be obviated, while at the same time the rashers of meat may be delivered to the customer in more pleasing and marketable form.

Referring more specifically to the drawings which exemplify the invention in its application to a meat slicing machine, a slicing knife 1, preferably in the form of a circular rotary blade is coöperatively mounted with a meat-bearing table or support 2 in any suitable manner whereby a relative movement between the knife and the table may be provided. Preferably, the knife 1 is journaled in a stationary pedestal or support, and the table 2 slidably mounted upon a stationary base plate 3 with one edge contiguous to the cutting plane of the knife 1.

The meat supporting table 2 is provided with any suitable means for moving the same backwardly and forwardly, from right to left, in Figs. 1, 9 and 10, the specific construction of which means forms no part of the present invention, but, as shown in Figs. 9 and 10, there is provided an upright shaft 24 which is journaled in the base member 14 and is provided with a crank arm 25 to which a link 26 is pivotally connected by one end as at 27. The other end of the link is pivotally connected as at 28 to the plate or support 2 which is adapted to move on the guides 29 in the ordinary and usual manner so that when the shaft 24 is rotated the crank arm 25 will be rotated and a relative movement between the table 2 and the knife or cutter 1 will be obtained. Mounted upon the table or support 2 is the usual follower 30 which is adapted to be advanced by means of a screw 31 with which the follower 30 has the usual connection. This screw 31 is rotated by means of the usual pawl and ratchet construction 32, 33, the pawl of which receives its movement from a cam or oscillating member 34 pivotally mounted to the table or support 2. One end of this cam or member 34 is connected to the pawl 32 by means of a link 35 and an anti-friction roller or projection 37 is provided on the link 26 so as to engage the arms 38, 39, of the cam or lever 34 to rock the latter about its pivot in one direction or the other according to the direction of movement of the support 2 to impart motion to the screw 31. The shaft 24 receives its motion from any source of power, such as a hand-wheel 40 which is connected to a shaft 41 and this latter is in turn connected to the shaft 24 through the medium of the intermeshing gears 42, 43. The gear 43 also has meshing with it another gear 44 which is connected to a shaft 45 on which shaft is secured a sprocket wheel 46. A sprocket chain 47 passes over the sprocket wheel 46 and also a sprocket wheel 48 on the axle of the knife or cutter 1. The specific construction, however, of the motion-imparting means, as has been before stated, forms no part of the present invention.

Adjacent the lateral edge of the moving plate 2 is mounted in any suitable manner a knife support 4, the edge of said knife support contiguous to said plate being provided with a recess 5 which increases in depth outwardly from the knife 1. This recess 5 adapts the knife support 4 to intercept the edge of meat over-hanging from the table 2 as it is advanced toward the knife 1, and to gradually raise such overhanging portion into the upper plane of the table 2. Adjustably mounted upon the knife support 4 is a rind-removing knife 6, said knife, as best shown in Fig. 3, being preferably substantially wedge-shaped and provided with an oblique cutting edge which when said knife is in operative position, over-reaches the table 2 to adapt it to sever the rind from the rasher which may be in process of being cut by the slicing knife. The knife 6 is preferably pivoted at its outer end by a pin 7 adapting the knife to be thrown into cutting position, as shown in Fig. 3, or to be drawn out of such cutting position. In order to provide means for rigidly clamping the knife to the support 4 in either its operative or inoperative position, it is provided with a depending pin 8 threaded below and extending through an arcuate slot 9 in said support 4, the lower threaded end being provided preferably with a thumb nut 10. In order to make the limit of the lateral movement of the knife 6 an adjustable limit to allow for the reduction in size of said knife from grinding, the end wall of the arcuate slot 9 has mounted therein, a small screw or grub 11, which grub may be adjusted to limit the lateral movement of the knife 6 to have it overreach the movable plate 2 the desired amount. To provide clearance for the thickness of rind to be removed, the blade 6 is spaced above the upper plane of the support 4, and is beveled above to insure a clean cut since if said blade were beveled below the wedge-shaped space between the blade 6 and recessed support 4 would be choked by the rind and fat thereon. Suitable means for mounting the knife support 4 may be provided by a bracket 12, which bracket is provided below with an offset portion 13 whereby it may be secured to a base member 14 which is preferably rigid or forms a part of the foundation upon which the plate 3 and the slicing knife 1 are mounted. In order to make the bracket 12 adjustable toward and away from the slicing knife 1 for the purpose of adjusting the position of the rind-removing knife with respect to the slicing knife 1, the offset portion 13 of the bracket 12 is provided with slots $13^1$ through which may be passed screws 15 or other suitable fastening devices.

Referring now to Figs. 5, 6, and 7, a device is exemplified by means of which two or more pieces of meat may have the rinds removed therefrom while the rashers are being cut therefrom. For this purpose an upright or standard 16 is detachably mounted on a knife support $4^1$ by having the lower threaded extremity thereof extended through a perforation in a protuberant portion 24 of the support $4^1$ and secured below by a suitable nut 17. Additional rind-removing knives are exemplified by a double knife illustrated in Figs. 6 and 7 which are designed for use on bacon, said double knife comprising a hub portion 18 from which project two parallel blades 19 and 20, beveled outwardly as shown in Fig. 7. The hub portion 18 is provided with a hole 21 adapting it to fit over the upright 16. A thumb screw 22 is threaded in the hub 18 for securing it at any desired point on the standard 16. The blades 19 and 20 are spaced at a suitable distance apart to sever the contiguously disposed rinds from two superposed pieces of bacon and together with the blade 6 mounted directly on the support $4^1$, adapt the machine to cut the rinds from three pieces of meat simultaneously. As will be evident any desired number of blades may be mounted in a similar manner above the support $4^1$.

What I claim is:

1. In a machine of the character described, the combination with a support for the article to be sliced and a slicing knife, there being relative movement between said support and knife, of a rind removing knife, and an adjustable support therefor, said rind removing knife being adjustable about a pivot on its support into and out of a position in which it extends across the cutting plane of the first said knife.

2. In a machine of the character described, the combination with a support for the article to be sliced and a slicing knife, said support being reciprocable relatively to said knife, of a second knife, a support for said second knife adjacent one edge of the article support, said second knife being pivotally mounted on its support to move into and out of position overhanging said article support, and means for locking the second knife to its support with any desired amount of overhanging.

3. In a machine of the character described, the combination with a support for the article to be sliced and slicing knife, there being relative movement between said support and knife, of a second knife arranged transversely of the first said knife and adjacent the upper plane of said support, and a support for the second knife, the lateral edges of said supports being contiguously disposed and the knife support being provided along its edge with a recess increasing in depth in the direction from which the article to be sliced approaches.

4. In a machine for slicing meat, the combination with a slicing knife, of a movable table for conveying the meat up to said knife, a support for a second knife arranged with one edge contiguous to the edge of the moving table and recessed along that edge, and a knife adjustably mounted on said support to overhang said recessed edge.

5. In a machine for slicing meat, the combination with a slicing knife, of a table for conveying the meat up to the said knife, a support for a second knife arranged with one edge contiguous to the edge of the moving table and recessed along that edge, and a knife adjustably mounted on said support to overhang said recessed edge, said knife being spaced above its support.

6. In a machine for slicing meat, the combination with a slicing knife, of a table for conveying the meat up to said knife, a support for a second knife arranged with one edge contiguous to the edge of the moving table and recessed along that edge, a knife adjustably mounted on said support to overhang said recessed edge, and other knives carried by said support.

7. In a meat slicing machine, the combination with a slicing knife, of a meat-holding table reciprocable toward and away from said knife, a knife support contiguous to and having its upper surface in substantially the same plane as the top of said table, said support being provided with a recess along its edge of gradually increasing depth away from the slicing knife, and a knife on said support arranged approximately parallel to the top face of the table and spaced therefrom to adapt it to cut the rind from a rasher of meat.

8. In a meat slicing machine, the combination with a slicing knife, of a meat-holding table reciprocable toward and away from said knife, a knife support contiguous to and having its upper surface in substantially the same plane as the top of said table, said support being provided with a recess along its edge of gradually increasing depth away from the slicing knife, and a knife on said support arranged approximately parallel to the top face of the table and spaced therefrom to adapt it to cut the rind from a rasher of meat, said support being adjustable relatively to said slicing knife and the second knife being adjustable toward and away from said table.

9. In a meat slicing machine, the combination with a slicing knife, of a meat-holding table reciprocable toward and away from said knife, a knife support contiguous to said table, a knife on said support arranged transversely to the cutting plane of the slicing knife, a detachable upright mounted upon said support, and a plurality of rind-removing knives mounted on said upright.

10. In a machine of the class described, the combination with a relatively movable meat support and slicing knife extending beyond the upper surface of said support to cut entirely through the meat and outer layer, means for removing the outer layer from only a slice cut from the article to be sliced, and means for supporting said outer layer while being cut by the slicing knife.

11. In a machine of the class described, the combination with a relatively movable meat support and slicing knife extending beyond the upper surface of said support, means for removing the outer layer from only a slice cut from the article to be sliced, and means for raising said slice and outer layer to the first recited means for supporting said outer layer while being cut.

12. In a machine of the class described, the combination with a relatively movable meat support and slicing knife extending beyond the upper surface of said support, means for removing the outer layer from only a slice cut from the article to be sliced, and means for gradually raising said slice and outer layer to the first recited means.

13. In a machine of the class described, the combination with a relatively movable meat support and slicing knife extending beyond the upper surface of said support to cut entirely through the meat and outer layer, means for removing the outer layer from only a slice cut from the article to be sliced, and means coöperating with the first recited means for raising and supporting the slice and the said outer layer with relation thereto and while being cut.

14. In a machine of the class described, the combination with a relatively movable support and slicing means extending beyond the upper surface of said support, of means for simultaneously removing the outer layer from only the slices cut from a plurality of separate pieces of meat.

15. In a machine of the class described, the combination with a relatively movable support and slicing means extending beyond the upper surface of said support, of means for simultaneously removing the outer layer from only the slices cut from a plurality of superposed pieces of meat.

16. In a machine of the class described, the combination with a support for the article to be sliced and upon which a plurality of articles may be superposed, and a slicing knife, said support and knife being capable of relative movement, of a plurality of rind removing knives supported one above the other, the cutting plane of the rind removing knives intersecting the cutting plane of the slicing knife.

17. In a machine of the class described, the combination with a support for the article to be sliced and upon which a plurality of articles may be superposed, a slicing knife, said support and knife being capable of relative movement, of a plurality of rind removing knives supported one above the other, the cutting plane of the rind removing knives intersecting the cutting plane of the slicing knife, and adjustable means for supporting the rind removing knives.

18. In a machine of the class described, the combination with a support for the article to be sliced and upon which a plurality of articles may be superposed, a slicing knife, said support and knife being capable of relative movement, of a plurality of rind removing knives, a support for these last recited knives upon which said knives are superposed one upon the other, the cutting plane of the rind removing knives intersecting the plane of the slicing, said rind removing knives being adjustable on their support toward and away from the meat support, and adapted to overhang the said meat support.

19. In a machine of the class described, the combination with a support for the article to be sliced and upon which a plurality of articles may be superposed, a slicing knife, said support and knife being capable of relative movement, of a plurality of rind removing knives, a support for these last recited knives upon which said knives are superposed one upon the other, the cutting plane of the rind removing knives intersecting the plane of the slicing, said rind removing knives being pivotally adjustable on their support toward and away from the meat support, and adapted to overhang the said meat support.

In testimony whereof I have signed my name to this specification, in the presence of two subscribing witnesses, on this 16th day of April A. D. 1910.

ENOS ALFRED HAND.

Witnesses:
C. F. KENZENKAMP,
G. POSTHLENIA.